United States Patent [19]

Huntington

[11] 3,733,777

[45] May, 22, 1973

[54] FLUE GAS RECOVERY METHOD AND APPARATUS

[76] Inventor: Richard L. Huntington, Route No. 1, Van Buren, Ohio 45889

[22] Filed: June 10, 1971

[21] Appl. No.: 151,759

[52] U.S. Cl. .............................. 55/48, 55/56, 55/73, 55/185, 55/199, 55/233, 261/17, 261/97, 261/111, 261/148, 261/149, 261/150, 261/151, 261/DIG. 9, 423/242
[51] Int. Cl. .............................................. B01d 19/53
[58] Field of Search .......................... 55/37, 38, 42, 48, 55/56, 73, 90, 93, 185, 199, 206, 208, 233; 261/17, 111, 148–151, DIG. 9, 44; 423/242

[56] References Cited

UNITED STATES PATENTS

| 2,134,481 | 10/1938 | Johnstone ............................. 423/242 |
| 2,838,135 | 6/1958 | Pilo et al. ........................... 261/151 X |
| 2,843,217 | 7/1958 | Von Linde ......................... 423/242 X |
| 3,249,151 | 5/1966 | Buss et al. ........................... 261/151 X |
| 3,386,798 | 6/1968 | Bevans et al. ..................... 261/DIG. 9 |
| 3,447,492 | 6/1969 | Kreimann et al. ................ 261/DIG. 9 |

*Primary Examiner*—Samih N. Zaharna
*Assistant Examiner*—R. W. Burks
*Attorney*—Owen & Owen

[57] ABSTRACT

The invention is an improved process for the recovery of, for example, sulfur dioxide and heat from flue gas employing direct contact packed-bed heat exchangers, a packed bed absorber and desorber and packed bed liquid-liquid heat exchangers of improved design. The process utilizes the thermal energy of the hot flue gas to: desorb sulfur dioxide, preheat combustion air and to reheat absorber tail gas. The formation of a vapor plume and loss in stack gas draft is minimized by operating the absorber at low temperatures and by reheating the absorber tail gases.

Heat is extracted from the hot flue gas and cooled by direct contact with an immiscible heat transfer fluid in a packed bed. Moisture is condensed from the flue gas by direct contact with cold heat transfer fluid, and separated from the heat transfer fluid by decantation. Sulfur dioxide is absorbed from the cooled flue gas in a packed bed by direct contact with a cold aqueous sulfite solution to form a bisulfite salt solution. The aqueous bisulfite salt solution is thermally decomposed and the sulfur dioxide desorbed by heating through direct contact with hot heat transfer fluid from the initial flue gas cooling step. Heat is recovered from the stripped sulfite absorption solution by direct contact with heat transfer fluid and used to preheat combustion air.

The decomposition of the bisulfite solution during the sulfur dioxide desorption process is aided by the heat transfer fluid which contains an organic acid which is partially miscible with water at elevated temperatures. Improved absorber design is based upon the use of slant packed beds, slant inlet-outlet packed bed access parts and slant packed bed tower internals for reduced bed cloggage, reduced absorber height and ease of packing replacement while the absorbers are in use.

23 Claims, 8 Drawing Figures

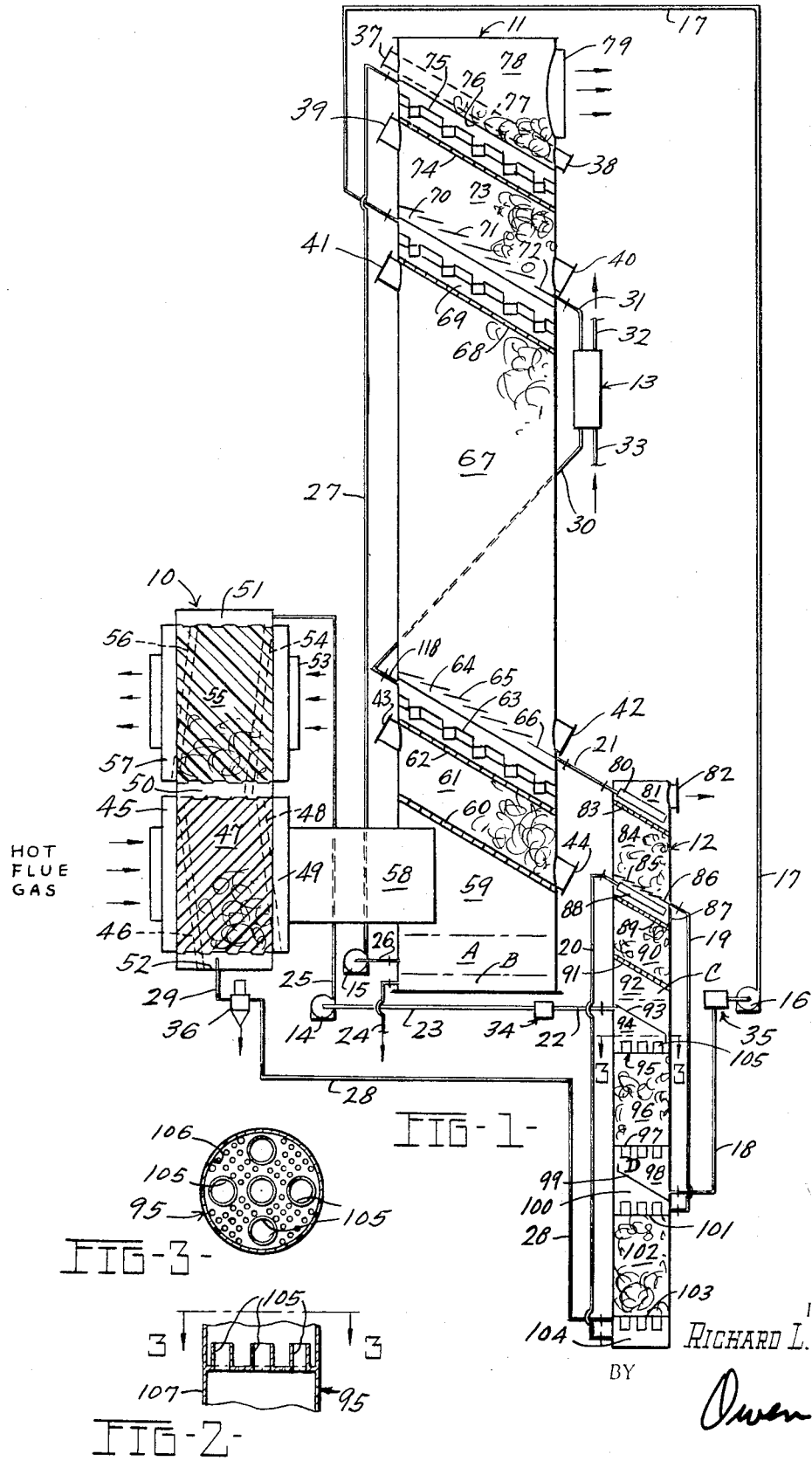

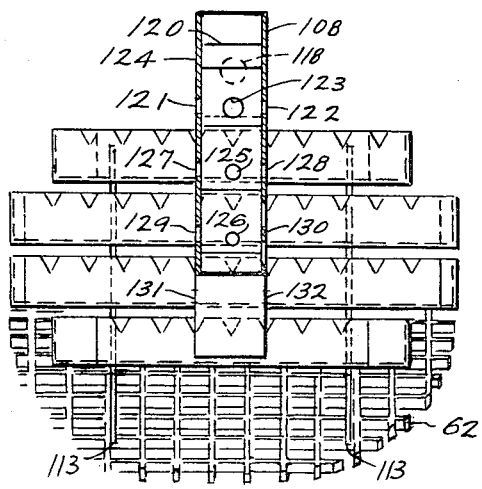
FIG-5-
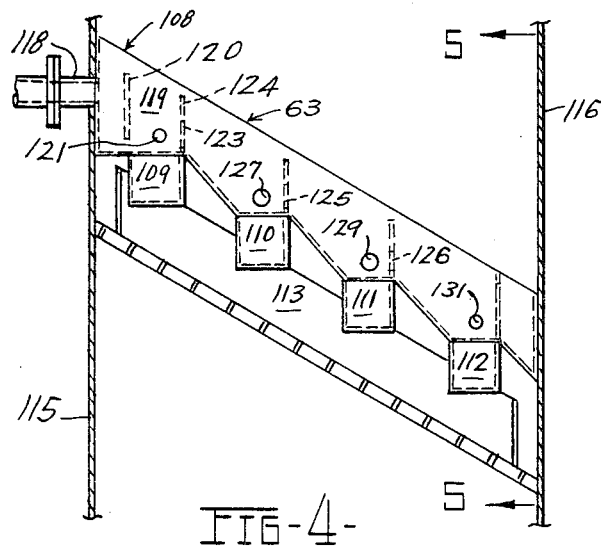
FIG-4-
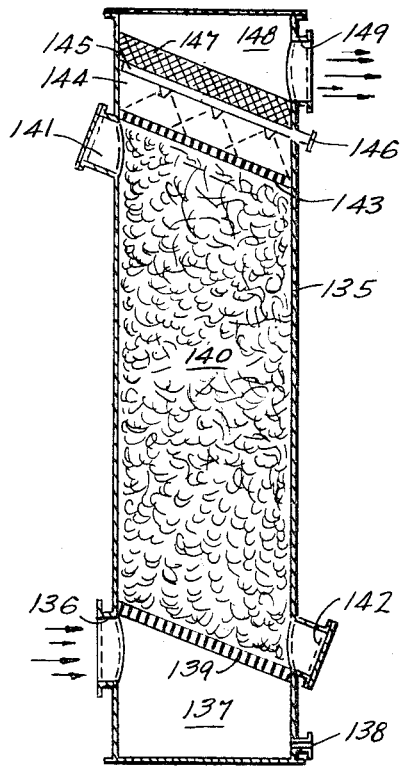
FIG-8-
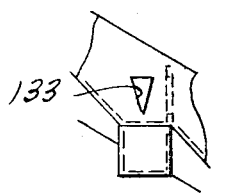
FIG-6-
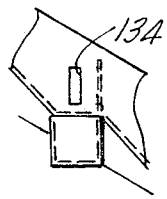
FIG-7-
INVENTOR:
RICHARD L. HUNTINGTON.
BY Owen & Owen
ATT'YS.

FLUE GAS RECOVERY METHOD AND APPARATUS

BACKGROUND OF THE INVENTION

The chemical technology involved in the separation of sulfur dioxide by absorption in aqueous alkali sulfite solutions to form bisulfite salts at low temperatures with subsequent desorption of the sulfur dioxide by thermal decomposition of the bisulfite at elevated temperatures and reduced pressure is well known in the art. Thermal decomposition of the alkaline bisulfite salt solutions is enhanced by partially miscible organic acids and by aluminum chloride which becomes active at elevated temperatures to supply hydrogen ions thereby aiding the bisulfite decomposition process.

Various prior art aqueous absorption processes have been unsuccessful because of high thermal energy requirements, excessive equipment maintenance costs due to the corrosive nature of the solutions, and frequent down time due to fouling caused by soot and fly ash.

Prior art wet processing of hot flue gas also resulted in excessive losses of the sulfur dioxide, large plume formations and an increase in sulfur dioxide concentration adjacent to the exhaust stack due to traces of sulfur dioxide in the scrubber tail gas. Prior art process economics often were, at best, borderline.

The recovery of thermal energy from furnace flue gases containing sulfur dioxide is usually limited to temperatures above the dew point of sulfuric acid, since operation at temperatures below the dew point results in the subsequent condensation of sulfuric acid on the surface of the heat recovery exchanger, resulting in the rapid corrosion of any metallic surface.

The recovery of thermal energy by direct contact of the hot flue gas with an organic heat transfer fluid in a bed packed with plastic saddles is not subject to corrosive action and both the sensible heat of the flue gas and latent heat of condensation of the water vapor can be recovered. Heat transfer coefficients as high as 1,000 BTU per hour per cubic foot per °F. can be achieved with 3 inch plastic saddles when operated at liquid rates of 3,000 pounds per hour per square foot and a gas rate of 1,800 pounds per hour per square foot, with thermal energy recovery on the order of 12,000 BTU per hour per cubic foot of packing when operated at a mean temperature difference of 12°F., this in the equivalent of 1 pound of coal burned per hour at 100 percent efficiency.

The average sensible and latent heat energy available in flue gas at 250°F. from the combustion of bituminous coal containing 4 percent sulfur for use in an absorption process operated at 70°F. would be approximately 9,000 BTU of sensible heat per pound of sulfur dioxide and 5,500 BTU of latent heat of condensation of water per pound of sulfur dioxide as compared to an energy requirement of 5,500 BTU per pound of sulfur dioxide for the average absorption desorption process. Flue gas temperatures in excess of 500°F. are often encountered in the operation of old furnaces with the result that excess energy can be utilized to either preheat boiler feed water or preheat combustion air. Still additional energy can be recovered by operating the absorption process at lower temperatures.

SUMMARY OF THE INVENTION

This invention relates to an absorption and desorption heat transfer process for the recovery of, for example, sulfur dioxide from flue gas with process energy supplied by the hot flue gas and more particularly to a multiple chambered packed bed absorber and desorber design for air pollution control.

However, the present process and apparatus is useable for other waste gases in addition to sulfur dioxide. For example, carbon dioxide can be absorbed by sodium carbonate to form sodium bicarbonate which in turn can be decomposed by heating to reform sodium carbonate and carbon dioxide. However, it has been found that the present invention is particularly adaptable to sulfur dioxide removal.

A multiple chamber slant packed bed absorber, according to the present invention, comprises packed bed chambers for the purposes of: cleaning and cooling the flue gas, water vapor condensation and separation, absorption of sulfur dioxide from the flue gas, scrubber tail gas heating and heat transfer fluid cooling.

A multiple chambered packed bed desorber, according to the present invention, comprises packed bed chambers for the purpose of: direct contact liquid-liquid heating of saturated sulfur dioxide absorbent solution, direct contact liquid-liquid cooling of hot stripped sulfur dioxide absorbent solution, desorption of sulfur dioxide from hot absorber solution and cooling desorbed sulfur dioxide gas.

The packed bed chambers are fitted with appropriate internal interconnecting passageways and access ports.

The sulfur dioxide recovery process, according to the present invention, consists of flue gas cleaning and cooling by direct contact with a low vapor pressure heat transfer fluid, condensation of moisture from flue gas, sulfur dioxide absorption in an aqueous sulfite solution, reheating the cooled flue gas by direct contact with warm heat transfer fluid, direct contact heating of saturated sulfur dioxide absorbent solution with hot heat transfer fluid, flash desorption of the sulfur dioxide from hot saturated aqueous absorber solution by heating with hot flue gas coolant heat transfer fluid, direct contact cooling of the stripped absorbent solution with cold immiscible heat transfer fluid, separation of the heat transfer fluid and absorbent solution by decantation, and condensation of water vapor from the desorbed sulfur dioxide gas by direct contact with cold saturated sulfur dioxide absorbent solution.

It is therefore an object of the present invention to provide an economical process for the recovery of waste gas from flue gas which utilizes the thermal energy of the flue gas and the scrubber tail gas for the disposal of waste process heat.

It is also an object of the present invention to provide an economical process for the control of waste gas and thermal air pollution.

It is an object of the present invention to provide improved process equipment for the recovery of corrosive gases.

It is an additional object of the present invention to provide a wet absorption process for the recovery of sulfur dioxide which is free from the side effects of loss in scrubber tail gas buoyancy due to cooling and resultant increase in local sulfur dioxide air pollution level.

It is still another object of the present invention that vapor plume formation is held to a minimum and sulfuric acid formations are not swept to ground level by local thermal inversions.

It is an object of the present invention to reduce coal combustion furnace cost by reducing secondary flue gas heat recovery equipment size by utilization of higher flue gas temperatures and thermal energy in the sulfur dioxide absorption process and the return of excess process heat to the boiler feed water and combustion air.

It is, therefore, an important object of the present invention to reduce the cost of furnace secondary heat recovery equipment by using direct contact heat transfer in a packed bed.

Still additional objects, benefits and advantages of the above mentioned invention will become evident from a detailed study of the following detailed description taken in conjunction with the accompanying drawings.

BRIEF DESCRIPTION OF THE DRAWINGS

FIG. 1 is a diagrammatic sectional view of a vertical flow, multiple chambered slant packed bed absorber and desorber heat exchanger unit, employing a cross flow dual packed bed flue gas heat exchanger precleaner, made in accordance with the present invention;

FIG. 2 is an elevational view of a liquid-liquid packed bed sulfur dioxide desorption cooling heat exchanger distributor, made in accordance with the present invention;

FIG. 3 is a top view of the liquid-liquid packed bed sulfur dioxide desorption column heat exchanger distributor shown in FIG. 2 and taken along the line 3—3 of FIG. 1;

FIG. 4 is an elevational view of a slant packed bed weir box liquid distributor made in accordance with the present invention;

FIG. 5 is a side view taken along the line 5—5 of FIG. 4;

FIGS. 6 and 7 are partial views of splitter box weir configurations shown in FIG. 4, made in accordance with the present invention; and FIG. 8 is a side view, with parts broken away, of a single bed slant packed bed absorber employing a spray liquid distributor, made in accordance with the present invention.

DESCRIPTION OF THE PREFERRED EMBODIMENTS

Referring to FIG. 1, the present embodiment of the invention is shown to include a cross flow dual packed bed flue gas heat exchanger cooler and precleaner 10; a multiple chambered slant packed bed absorber heat exchanger unit 11; a multiple chambered packed bed desorption heat exhanger unit 12; an auxiliary heat exchanger fluid inter cooler 13; auxiliary pumps 14, 15 and 16; interconnecting piping lines 17–33; constant head tanks 34 and 35; fly ash and sludge cyclone 36; and slant packed bed fill and clean out access ports 37–44.

The cross flow dual packed bed flue gas heat exchanger cooler and precleaner 10 includes a flue gas inlet plenum chamber 45, a packed bed flue gas inlet grill 46, a packed bed flue gas cooling chamber 47, a flue gas outlet grill 48, outlet plenum chamber 49, heat transfer fluid distributors 50 and 51, heat transfer fluid sump 52, furnace make up air inlet plenum chamber 53, make up air inlet grill 54, a packed bed make up air heating chamber 55, warm make up air outlet grill 56, and warm air outlet plenum chamber 57.

The multiple chambered slant packed bed absorber heat exchanger unit 11 which is defined by a hollow shell includes a flue gas inlet port 58, a gas inlet plenum chamber and sump 59, a slant packed bed support plate grill 60, a slant packed bed flue gas cooling chamber 61, a slant packed bed hold down grill 62, a slant heat transfer fluid weir box distributor assembly 63, a slant weir box distributor plenum chamber 64, a slant louvered packed bed absorption support plate 65, a support plate sump 66, a packed bed sulfur dioxide absorption chamber 67, a slant absorber packed bed hold down grid 68, a slant absorption solution weir box distributor assembly 69, a slant weir box distributor plenum chamber 70, a slant louvered absorber tail gas reheat packed bed support plate 71, a support plate sump 72, an absorber tail gas packed bed reheat chamber 73, a slant packed bed hold down grid 74, a slant weir box heat transfer fluid distributor assembly 75, a slant weir box distributor plenum chamber 76, a slant packed bed mist eliminator 77, an absorber tail gas outlet plenum chamber 78 and a gas outlet port 79.

The multiple chambered packed bed desorption heat exchanger unit 12 which is defined by a hollow shell includes a slant absorption solution inlet distributor 80, a sulfur dioxide gas plenum chamber 81, a sulfur dioxide gas outlet port 82, a slant packed bed hold down grid 83, a slant sulfur dioxide packed bed cooling chamber 84, a slant louvered support plate 85, a slant liquid support plate sump 86, a slant desorption solution distributor plenum chamber 87, a slant desorption liquid distributor 88, a slant packed bed hold down grill 89, a slant sulfur dioxide desorption packed bed chamber 90, a slant packed bed support plate grill 91, a slant absorption solution liquid sump chamber 92, a slant absorption solution and cold heat transfer fluid diverter plate partition 93, a heat transfer fluid sump 94, an absorption solution sieve plate distributor 95, a packed bed liquid-liquid absorption solution cooling chamber 96, a heat transfer fluid distributor 97, an absorption solution liquid sump 98, a slant absorption solution and heat transfer fluid diverter plate 99, a heat transfer fluid sump 100, an absorption solution sieve plate distributor 101, a packed bed liquid-liquid absorption solution heating chamber 102, a heat transfer fluid sieve plate distributor 103, and a hot absorption liquid sump chamber 104.

The heat transfer fluid inter cooler 13 includes the heat transfer fluid inlet-outlet piping 31 and 30 and the coolant inlet-outlet piping 33 and 32.

The absorption solution sieve plate distributor 95 (FIG. 2 and FIG. 3) includes a plurality of heat transfer fluid downcomer and riser bypass ports 105, an absorption solution distributor pan 106 containing a plurality of perforations and the column wall 107. The distributors 97, 101 and 103, shown in FIG. 1, are constructed in a similar manner.

Referring now to FIG. 4, the slanting weir box assembly 63 includes a slanting cascade multiple chambered splitter weir box 108, resting upon horizontal overflow weir boxes 109, 110, 111 and 112 which are supported by wall cross members 113. The cross members 113 are supported by the unit chamber walls 115 and 116. The slanting packed bed hold down grill 62 is positioned below the cross members 113. In operation, irrigation liquid enters the slanting cascade splitter weir box 108 through the inlet port 118 and is uniformly spread across a submerged orifice splitter box compartment 119 by a baffle 120. Liquid flow from the compartment 119 is divided between holes 121 and 122 in the sides of the splitter box compartment 119 (see FIG. 5) and the central hole 123 in the splitter box partition 124. The cascading liquid flow from the central hole 123 and additional central holes 125 and 126 are divided and directed into respective V notched weir boxes 110, 111, and 112 by holes 127-132 in the sides of the splitter box 108. FIG. 6 shows a side hole 133 having a triangular cross section while FIG. 7 shows another embodiment of a side hole 134 having a rectangular cross section.

FIG. 8 shows a typical packed bed absorber with parts broken away, made in accordance with the present invention. The absorber includes a hollow shell 135, a gas inlet port 136, a hollow gas inlet plenum and liquid sump chamber 137, a sump liquid outlet port 138, a slanting packed bed grill support plate 139, a packed bed chamber containing suitable packing 140, a slanting packed bed fill port 141 and clean out port 142, a packed bed hold down grid 143, a slanting distributor chamber 144, a spray header and spray nozzle distributor assembly 145, a spray header liquid inlet port 146, a mist eliminator bed 147, a gas outlet plenum chamber 148 and a gas outlet port 149.

PROCESS DESCRIPTION

Referring to FIG. 1, in the present embodiment of the invention, hot flue gas enters the dual bed cross flow heat exchanger 10 passing horizontally through the gas inlet plenum chamber 45 and gas inlet grill 46 into the packed bed chamber 47 where the hot flue gas is cooled by and heats down flowing heat transfer fluid. The cooled flue gas leaves the packed bed 47 through the gas outlet grill 48 and outlet plenum chamber 49. The hot heat transfer fluid passes downward through the packed bed chamber 47 collecting in the sump 52. The hot heat transfer fluid in the sump 52 is fed through the liquid sludge cyclone 36 through the piping 29 and 28 to the desorption column unit 12. The hot heat transfer fluid is distributed across the liquid-liquid packed bed heat exchanger chamber 102 by the sieve plate distributor 103, flowing upward through the packed bed chamber 102 where the heat transfer fluid is cooled by and heats down flowing saturated sulfur dioxide absorption solution. The cooled heat transfer fluid passes upward through riser ports in the sieve plate distributor 101 and is deflected by the partition 99 to the sieve plate distributor 97 flowing upward through the packed bed liquid-liquid heat chamber 96 where the cold heat transfer fluid is heated by and cools down flowing hot stripped sulfur dioxide absorption solution. The hot heat transfer fluid flows upward through riser ports in the sieve plate distributor 95 collecting in the liquid sump 94 where it is returned to the dual packed bed cross flow heat exchanger 10 through the interconnecting piping 22, 23 and 25, constant head tank 34 and pump 14. The hot heat transfer fluid flows downward through the distributor 51 into the packed bed 55 where it is cooled by and heats cold furnace make up air which enters the packed bed 54 passing horizontally through the inlet plenum chamber 53, gas inlet grill 54, packed bed 55, gas outlet grill 56 and outlet plenum chamber 57. The cooled heat transfer fluid flows downward through the packed bed chamber 55 and is collected by and flows downward through the distributor 50 into the packed bed flue gas cooling chamber 47.

The precleaned and precooled warm flue gas from the dual packed bed heat exchanger 10 enters the multiple chambered slant packed bed absorber heat exchanger column unit 11 through the interconnecting passageway 58, passes into the plenum and liquid sump chamber 59, passes upward through the slant packed bed support plate grid 60 into the packed bed chamber 61 where the flue gas is cooled further and moisture condensed from the flue gas by cold down flowing heat transfer fluid. The cold flue gas leaves the packed bed 61 flowing upward through the slant packed bed hold down grill 62 upward through the slant heat transfer fluid distributor chamber 64, upward through the louvered support plate 65 into the packed bed sulfur dioxide absorption chamber 67 where sulfur dioxide is absorbed by down flowing cold absorption solution. The cold sulfur dioxide free flue gas passes upward from the packed bed 67, through the slant packed bed hold down grill 68 upward, through the slant absorption solution distribution chamber 70, upward through the slant louvered support plate 71 into the absorber tail gas reheat packed bed chamber 73 where the absorber tail flue gas is heated by and cools down flowing warm heat transfer fluid. The warmed absorber tail gas leaves the tail gas reheat packed bed chamber 73 passing upward through the slant packed bed hold down grill 74. The gas continues upwardly through the slant heat transfer fluid distributor chamber 76, upward through the slant packed bed mist eliminator 77, through the flue gas plenum chamber 78 and flue gas outlet port 79 to a disposal stack (not shown).

Warm heat transfer fluid is supplied to the absorber tail gas reheat packed bed chamber 73 from the base inlet sump plenum chamber 59 by interconnecting piping 26 and 27 and pump 15 and is distributed across the slant tail gas reheat packed bed 73 by the slant weir box distributor assembly 75, flowing downward through the slant packed bed hold down grill 74 into the slant packed bed 73 where the warm heat transfer fluid is cooled by and heats upflowing absorber tail gas. The cooled heat transfer fluid flows downward through the slant packed bed 73 and is collected by the louvered support plate 71 in the support plate sump 72, flowing downward through the piping 31, through the heat transfer fluid cooler 13 and connecting piping to the slant weir box distributor assembly 63 where it is distributed across the slant packed bed flue gas cooling chamber. It continues to flow downwardly through the slant packed bed hold down grill 62 into the slant packed bed flue gas cooling chamber 61 where moisture is condensed from and the heat transfer fluid heated by warm up flowing flue gas. The warm heat transfer fluid and moisture pass downward through the packed bed 61, slant packed support plate grill 60, plenum chamber and sump 59, and collects in the sump to form a warm layer of heat transfer fluid A and water layer B. The warm heat transfer fluid A is returned to the tail gas reheat packed bed 73 and the condensate water B is removed from the column through the piping 24.

For purposes of simplicity the heat transfer fluid inter cooler 13 is shown to be of conventional shell and tube design with coolant water supplied to and returned by the pipes 33 and 32. Further cooling of the heat transfer fluid can be readily accomplished by recirculating the heat transfer fluid to a cooling water spray pond, or by other means (not shown).

Cold sulfur dioxide absorption solution is supplied to the slant sulfur dioxide weir box distributor assembly 69 from the sulfur dioxide desorption column unit 12 through the interconnecting piping 17 and 18, the constant head tank 35 and the pump 16. The cold sulfur dioxide absorption solution flows downward from the distributor assembly 69 through the slant packed bed hold down grid 68, downward through the slant packed bed chamber 67 counter current to the upflowing flue gas. Sulfur dioxide is absorbed by the downflowing absorption solution which is collected by the louvered slant packed bed support plate 65, and support plate sump 66 and leaves the packed bed column unit 11 through the piping 21 and is delivered to the desorption column unit 12.

Cold saturated sulfur dioxide solution entering the desorption column 12 from the packed bed absorption chamber 67 is distributed by the liquid distributor 80. The solution flows downwardly through the slant packed bed hold down grid 83, downward through the slant packed bed 84 where the absorption solution is saturated, heated by and cools upwardly flowing sulfur dioxide gas saturated with moisture. The warmed saturated sulfur dioxide absorbent solution flows downward to the slant louvered packed bed support plate 85 and liquid sump 86 through the external piping 19 to the liquid-liquid heat exchanger distributor 101 and is distributed across the packed bed 102. It then flows downwardly through the packed bed 102 where the saturated absorption solution is heated by and cools upwardly flowing heat transfer fluid. The hot saturated absorption solution continues to flow downwardly through the packed bed 102 and sieve plate distributor 103. After it reaches the liquid sump 104 the hot solution leaves the unit 12 through the piping 20 and is lifted by sulfur dioxide gas and steam to the slant sulfur dioxide desorption distributor 88 where it passes downwardly through the slant packed bed hold down grill 89 into the slant packed bed desorption chamber 90 where sulfur dioxide and steam flash from the hot absorption solution. The sulfur dioxide and steam pass upward through the slant packed bed desorption chamber 90, upwardly through the slant packed bed hold down grill 89, upward through the slant distributor chamber 87 and slant louvered packed bed support plate 85 into the sulfur dioxide gas cooling slant packed bed 84 where the sulfur dioxide gas is cooled and moisture condensed from the gas by cold down flowing absorption solution. The cooled sulfur dioxide gas passes upward from the slant packed bed 84 through the slant packed bed hold down grill 83 and distributor chamber 81, leaving the desorption column unit 12 through the outlet port 82 under reduced pressure.

The hot stripped sulfur dioxide absorption solution flows downward through the slant packed bed desorption chamber 90 through the slant packed bed support plate grid 91 into the slant sump chamber 92 to form a layer of hot solution C which flows downward past the slanting partition 93 to the sieve plate distributor 95 and is distributed across the packed bed liquid-liquid heat exchanger chamber 96. The hot absorption solution passes downward through the sieve plate distributor 95 and packed bed 96 and is cooled by and heats upwardly flowing cold heat transfer fluid. The cooled absorption solution leaves the packed bed chamber 96 through the liquid distributor 97 and is collected by the slant partition 99 to form a layer of cold sulfur dioxide absorbent solution D which is returned to the packed bed absorption chamber 67 through the interconnecting piping 17 and 18, constant head tank 35 and pump 16 as mentioned above.

Absorption solutions suitable for the regenerative recovery of sulfur dioxide in the present invention include: ammonium sulfite, methylamine sulfite, sodium sulfite, potassium sulfite, and buffered salt solutions, with the sulfites of ammonia, methylamine and sodium preferred because of their low regenerative thermal energy requirements.

Heat transfer fluids suitable for thermal energy recovery, according to the present invention, include: molten paraffin wax, liquid paraffin (Eugenol), and paraffin based waste cylinder oils. Partially miscible organic acids include paraffin oxidation products, oleic, stearic and palmitic acids.

Disposal of paraffin wax and cylinder oil, heat transfer fluids contaminated with fly ash, soot, and other impurities is readily accomplished by thermal decomposition with sulfur by heating to above 250°C. to form hydrogen sulfide which can be reacted with sulfur dioxide to form elemental sulfur.

While the above invention has been described with particular reference to the simplified embodiment shown in the drawings for purpose of illustration, many changes may be made in detailed layout and construction for purposes of maintenance, chemical treatment of absorption solution as well as other process modifications.

What I claim is:

1. Absorption-desorption apparatus for use in recovering a gas from hot flue gas, for utilizing flue gas thermal energy, and for reheating absorber tail gas comprising, in combination, a multi-chamber absorber unit, said multi-chamber absorber unit including a packed bed flue gas cooling chamber, a packed bed absorption chamber and a tail gas packed bed reheat chamber, a heat transfer fluid intercooler in communication with said multi-chamber absorber unit, a multi-chambered packed bed desorption unit in communication with said multi-chamber absorber unit, including a packed bed gas cooling chamber, a packed bed desorption chamber, a packed bed liquid-liquid absorption solution cooling chamber and a packed bed liquid-liquid absorption solution heating chamber, and means for distributing and purifying absorption solution and heat transfer fluid.

2. Apparatus according to claim 1, including a dual packed bed flue gas heat exchanger unit for cooling and precleaning said flue gas.

3. Apparatus according to claim 2, wherein said dual packed bed flue gas heat exchanger unit includes a packed bed make-up air heating chamber and a packed bed flue gas cooling chamber.

4. An absorption-desorption process for recovering sulfur dioxide from hot flue gas comprising the steps of extracting thermal energy from the hot flue gas by directly contacting the flue gas with a cold heat transfer fluid forming a cold flue gas stream and a hot heat transfer fluid stream, extracting sensible thermal energy by cooling the flue gas with the cold heat transfer fluid and extracting latent thermal energy by condensing water from the flue gas with the cold heat transfer fluid and wherein the sulfur dioxide is continuously absorbed from the cold flue gas stream by contact with a cold aqueous absorption solution in an absorption chamber to form a cold saturated absorption solution and a cold sulfur dioxide free absorption chamber tail flue gas stream and continuously separating the water from the heat transfer fluid stream.

5. An absorption-desorption process for recovering sulfur dioxide from hot flue gas as set forth in claim 4, wherein said sulfur dioxide is continuously desorbed from the absorption solution by heating the cold saturated absorption solution stream by passing the cold absorption solution downwardly through a packed bed sulfur dioxide cooling chamber in direct contact with an upwardly flowing warm saturated sulfur dioxide gas stream to produce a cold sulfur dioxide gas stream and warm saturated absorption solution stream with the warm saturated absorption solution stream heated by direct contact at elevated pressure with the hot heat transfer fluid stream in a packed bed counter flow liquid-liquid heat exchanger, with said hot heat transfer fluid flowing upward through the liquid-liquid heat exchanger to produce a warm heat transfer fluid stream and said saturated absorption solution flowing downward through the liquid-liquid heat exchanger to produce a hot saturated absorption solution with the hot saturated absorption solution flowing upward to a packed bed desorption chamber and flashing to produce the up flowing warm saturated sulfur dioxide gas stream and a down flowing hot stripped absorption solution stream, with the hot stripped absorption solution passing downward and the warm heat transfer fluid stream flowing upward through a packed bed liquid-liquid counter flow heat exchanger to produce a hot heat transfer fluid stream and warm absorption solution stream.

6. An absorption-desorption process for recovering sulfur dioxide from hot flue gas as set forth in claim 5, wherein the hot heat transfer fluid is used to heat cold furnace make-up combustion air.

7. An absorption-desorption process for recovering sulfur dioxide from hot flue gas as set forth in claim 4, wherein the cold absorption chamber tail flue gas is heated by direct contact with the warm heat transfer fluid stream in a packed bed absorber tail gas reheat chamber to form a warm sulfur dioxide free flue gas stream and a cooled heat transfer fluid stream with said warm sulfur dioxide free flue gas vented to the atmosphere and said cooled heat transfer fluid stream returned to the packed bed flue gas cooling chamber.

8. An absorption-desorption process for recovering sulfur dioxide from hot flue gas as set forth in claim 6, wherein said heat transfer fluid comprises in part a partially water miscible organic acid, and a high molecular weight paraffin.

9. An absorption-desorption process for recovering sulfur dioxide from hot flue gas as set forth in claim 6, wherein said sulfur dioxide absorption solution comprises in part an alkaline sulfite bisulfite solution and hydroquinone oxidation inhibitor.

10. A multiple compartment packed bed absorber unit comprising, in combination, a slant packed bed counter flow flue gas cooling chamber, a slant packed bed counter flow absorption chamber, a slant packed bed counter flow absorber tail gas reheat chamber effective to reheat tail gas, a slanting packed bed mist eliminator chamber, and means for distributing a heat transfer fluid, absorption fluid and a gas stream.

11. Apparatus according to claim 10, wherein said packed beds include slant fill and clean out ports.

12. A multiple compartment packed bed absorber unit as set forth in claim 10, wherein said slant packed bed counter flow flue gas cooling chamber includes a hollow shell, said shell defining a slant gas inlet plenum chamber and inlet port, a slant packed bed chamber, a slant distributor chamber, said slant gas inlet plenum chamber being partitioned from said packed bed chamber by a slant packed bed support grill, said packed bed chamber containing tower fill and partitioned from said slant distributor chamber by a slant packed bed hold down grill, said slant distributor chamber containing a slant heat transfer fluid distributor and heat transfer fluid and outlet ports, and means for circulating a common heat transfer fluid.

13. A multiple compartment packed bed absorber unit as set forth in claim 10, wherein said slant packed bed counter flow absorption chamber includes a hollow shell, said shell defining a slant gas inlet chamber, a slant packed bed chamber, a slant distributor chamber, said slant gas inlet chamber partitioned from said slant packed bed by a slant louvered packed bed support plate and a liquid sump communicating with a liquid outlet port, said slant packed bed chamber containing tower fill and partitioned from said slant distributor chamber by a slant packed bed hold down grill, said slant distributor chamber containing an absorption solution liquid distributor, and means for recirculating a common absorption solution.

14. A multiple compartment packed bed absorber unit as set forth in claim 10, wherein said slant packed bed counter flow absorber tail gas reheat chamber includes a hollow shell, said shell defining a slant gas inlet chamber, a slant packed bed chamber, a slant distributor chamber, said slant inlet chamber partitioned from said slant packed bed by a slant louvered packed bed support plate and a liquid sump communicating with a liquid outlet port, said slant packed bed chamber containing tower fill and partitioned from said slant distributor chamber by a slant packed bed hold down grill, said distributor chamber containing a heat transfer fluid distributor and liquid inlet port, and means for circulating a common heat transfer fluid.

15. A multiple compartment packed bed absorber unit as set forth in claim 10, wherein said slanting packed bed mist eliminator includes a hollow shell, said shell defining a distributor chamber, a slant packed bed eliminator chamber, a slant outlet chamber and gas outlet port, said packed bed chamber containing tower fill.

16. A unitized slant packed bed absorber unit comprising, in combination, a hollow shell, said shell partitioned into a base gas inlet plenum liquid sump chamber, a gas inlet port communicating with said sump chamber, said plenum liquid sump chamber partitioned from a slanting packed bed chamber by a slanting packed bed gas liquid inlet outlet grill, said support grill supported by said absorber shell, said packed bed containing suitable tower fill and partitioned from a slanting distributor gas plenum chamber by a slanting packed hold down gas outlet liquid inlet grill, said hold down grill supported by said absorber shell, said distributor gas plenum chamber containing a slanting liquid distributor communicating with a liquid inlet port, said liquid distributor plenum chamber partitioned from a gas outlet plenum chamber and outlet port by a slanting mist eliminator filter supported by said absorber shell, said packed bed shell having slanting clean out and fill ports.

17. a slanting packed column liquid distributor comprising, in combination, a slanting multiple compartment liquid inlet splitter trough, said compartments having side wall perforations and perforated compartment partitions arranged in cascade, said liquid splitter trough wall perforations positioned above a series of step spaced apart horizontal liquid distributor pans in transverse underlying relation to said splitter trough and positioned so as to receive liquid from respective trough wall perforations, said pans being notched with evenly longitudinally spaced v-cuts.

18. A multiple chambered packed desorber unit comprising, in combination, a hollow shell, said shell defining a slant packed bed gas cooling chamber, a slant packed bed desorption chamber, a packed bed liquid-liquid stripped absorption solution heat exchanger chamber and a packed bed liquid-liquid saturated absorption solution heat exchanger chamber.

19. A multiple chambered packed desorber unit as set forth in claim 18, wherein said slant packed bed gas cooling chamber contains suitable tower fill, a slant louvered packed bed support plate and liquid sump, a slant packed bed hold down grill, and means for distributing liquid downwardly therethrough.

20. A multiple chambered packed desorber unit as set forth in claim 18, wherein said desorption chamber contains suitable tower fill and includes a slant packed bed support grill, a slant packed bed hold down grill, means for distributing liquid downwardly therethrough, and a liquid sump chamber.

21. A multiple chambered packed bed desorber unit as set forth in claim 18, wherein said packed bed liquid-liquid absorption solution heat exchanger chambers include a lower liquid distributor, an upper liquid distributor and liquid inlet-outlet means.

22. A multiple chambered packed bed desorber unit as set forth in claim 21, wherein said upper and lower liquid distributors include a perforated sieve plate distributor pan having a plurality of liquid downcomer and riser bypass ports, with said downcomer and riser ports comprising hollow cylinders defining passageways through said pans.

23. An absorption-desorption process for removing waste gases from hot exhaust gas comprising the steps of extracting thermal energy from the hot exhaust gas by directly contacting the hot exhaust gas with a cold heat transfer fluid to form a hot heat transfer fluid stream and a cold exhaust gas stream, absorbing the waste gases from the cold exhaust gas stream by direct contact with a cold aqueous absorption solution to produce a cold stripped exhaust gas stream and a cold saturated absorption solution, contacting the cold absorption solution with the hot heat transfer fluid stream to produce a concentrated waste gas stream and a cold heat transfer fluid stream, with the cold stripped exhaust gas stream being reheated by direct contact with the hot heat transfer fluid stream, and disposing of excess heat by refrigeration.

* * * * *